(12) United States Patent
Berthels et al.

(10) Patent No.: US 8,658,709 B2
(45) Date of Patent: Feb. 25, 2014

(54) PROCESS FOR MAKING A POLYURETHANE FOAM

(75) Inventors: Philip Berthels, Veltem-Beisem (BE); Raf Elen, Oplinter (BE); Luc Van Essche, Kortenberg (BE)

(73) Assignee: Huntsman International LLC, The Woodlands, TX (US)

( * ) Notice: Subject to any disclaimer, the term of this patent is extended or adjusted under 35 U.S.C. 154(b) by 531 days.

(21) Appl. No.: 12/294,066

(22) PCT Filed: Feb. 22, 2007

(86) PCT No.: PCT/EP2007/051706
§ 371 (c)(1),
(2), (4) Date: Sep. 23, 2008

(87) PCT Pub. No.: WO2007/110286
PCT Pub. Date: Oct. 4, 2007

(65) Prior Publication Data
US 2009/0118386 A1    May 7, 2009

(30) Foreign Application Priority Data

Mar. 24, 2006    (EP) .................................... 06111700

(51) Int. Cl.
*C08G 18/00*    (2006.01)

(52) U.S. Cl.
USPC ............................ 521/174; 521/155; 521/170

(58) Field of Classification Search
USPC ................................................. 521/170, 174
See application file for complete search history.

(56) References Cited

U.S. PATENT DOCUMENTS

| 4,423,110 | A | | 12/1983 | Sato |
| 4,781,774 | A | | 11/1988 | Steward et al. |
| 4,833,176 | A | | 5/1989 | Wolf et al. |
| 4,910,231 | A | | 3/1990 | Pham et al. |
| 4,916,168 | A | | 4/1990 | Pham et al. |
| 5,043,360 | A | | 8/1991 | Pham et al. |
| 5,270,348 | A | | 12/1993 | Muller et al. |
| 5,334,448 | A | | 8/1994 | Horn et al. |
| 5,369,138 | A | | 11/1994 | Gansen |
| 5,416,125 | A | * | 5/1995 | Liman et al. ................... 521/160 |
| 5,494,941 | A | * | 2/1996 | Lutter et al. ................... 521/159 |
| 5,621,016 | A | | 4/1997 | Murty et al. |
| 5,698,609 | A | * | 12/1997 | Lockwood et al. ............ 521/173 |
| 5,877,227 | A | * | 3/1999 | Murty ............................. 521/159 |
| 5,900,442 | A | | 5/1999 | Leenslag et al. |
| 6,096,237 | A | | 8/2000 | Narayan et al. |
| 6,248,802 | B1 | * | 6/2001 | Singh et al. .................... 521/131 |
| 6,417,241 | B1 | | 7/2002 | Huygens et al. |
| 6,770,684 | B2 | | 8/2004 | Lutter et al. |
| 6,784,218 | B1 | * | 8/2004 | Apichatachutapan et al. ............................... 521/133 |
| 6,884,824 | B2 | * | 4/2005 | Bleys et al. .................... 521/159 |
| 6,884,825 | B2 | * | 4/2005 | Daunch et al. ................. 521/174 |
| 2003/0087978 | A1 | | 5/2003 | Parfondry et al. |

FOREIGN PATENT DOCUMENTS

| EP | A 286571 | 10/1988 |
| EP | A 296449 | 12/1988 |
| EP | A 309217 | 3/1989 |
| EP | A 309218 | 3/1989 |
| EP | A 353785 | 2/1990 |
| EP | A 555721 | 8/1993 |
| EP | A 566248 | 10/1993 |
| EP | A 566251 | 10/1993 |
| EP | A 830419 | 11/1996 |
| EP | A 1247827 | 10/2002 |
| EP | A 1304201 | 4/2003 |
| WO | WO-A 00/08083 | 2/2000 |
| WO | WO-A 01/53370 | 7/2001 |

\* cited by examiner

*Primary Examiner* — Melissa Rioja
(74) *Attorney, Agent, or Firm* — Robert A. Diaz

(57) ABSTRACT

Process for preparing a polyurethane foam, according to the free rise process, the foam having a free rise density of 5-40 kg/m$^3$, comprising reacting at an index of 40-80 a polyisocyanate composition consisting of diphenylmethane diisocyanate and of homologues of diphenylmethane diisocyanate, said homologues having an isocyanate functionality of 3 or more, and wherein the polyisocyanate composition has an average isocyanate functionality of 2.10-2.40 and a 2,4'-diphenylmethane diisocyanate content of 6-45% by weight with the proviso that the relationship between this functionality (F) and content (C) is: $-123F+287 \leq C \leq -123F+311$, and a polyoxyethylene polyoxypropylene polyol (polyol b1) having an oxyethylene content of 5-30% by weight, a nominal functionality of 2-4 and an average equivalent weight of 1000-3000, and comprising using 5-20 parts by weight, per 100 parts by weight of polyol b1, of water as blowing agent, an effective amount of a catalyst enhancing urethane formation, and an effective amount of a surfactant.

Foams are claimed as well. The foams show good sound absorption and/or sound insulation.

11 Claims, No Drawings

PROCESS FOR MAKING A POLYURETHANE FOAM

CROSS REFERENCE TO RELATED APPLICATIONS

This application is the National Phase of International Application PCT/EP2007/051706 filed Feb. 22, 2007 which designated the U.S. and which claims priority to European (EP) Pat. App. No. 06111700.8 filed Mar. 24, 2006. The noted applications are incorporated herein by reference.

The present invention is concerned with a process for preparing a polyurethane foam. Such processes have been widely described.

EP 309217, for instance, describes a process for preparing a flexible polyurethane foam in a one shot process at a low index by reacting a certain diphenylmethane diisocyanate and a certain specified polyol. The foams obtained have a rather high density.

In EP 309218 a similar process is described, wherein more water as blowing agent is used, leading to flexible foams having a low density. The flexible foams obtained are useful in furniture and automotive seating and mattresses. EP 296449 also discloses the preparation of flexible foams at a low index while using high amounts of water. Mouldings are made from polyisocyanates comprising high amounts of toluene diisocyanate and/or high amounts of diphenylmethane diisocyanate (MDI) and 2,4'-MDI. The foams are used for the same purpose.

WO 00/08083 and WO 01/53370 describe a process for making moulded and free rise or slabstock foam using a specified polyisocyanate comprising a high amount of diphenylmethane diisocyanate (MDI). The foams obtained are used in mattresses, cushions, furniture seating and automotive seating.

Further EP 830419 describes the preparation of a rigid foam having a low density by reacting in a one shot process a certain diphenylmethane diisocyanate and a certain isocyanate-reactive composition. By rather severe crushing of the rigid foam obtained, a certain flexible foam may be obtained. Recovery from such severe crushing requires a subsequent recovery stage at elevated temperature. The used amount of polyols having a high molecular weight is rather low. The flexible foam obtained shows no major glass-rubber transition between −100° C. and +25° C.

EP 555721 describes a process for preparing cold cure, moulded flexible foams using a relatively low amount of water at a higher index.

Finally U.S. Pat. No. 6,096,237 discloses the use of certain polyisocyanate mixtures for making thermoformable polyurethane foams. The amount of water used is relatively low and the polyols used have been described in a rather general way.

Surprisingly we have found that foams with very good sound absorbing and/or sound insulating properties can be made provided a specific polyisocyanate composition is used. A relatively small selection of polyisocyanate compositions is useful within those having a functionality (F) of 2.10-2.40 and having a 2,4'-diphenylmethane diisocyanate (2,4'-MDI) content (C) of 6-45% by weight. From these polyisocyanates, those are suitable which have a C which meets the formula $-123F+287 \le C \le -123F+311$ and preferably $-123F+293 \le C \le -123F+305$.

In addition to the requirements as to the polyisocyanates to be used, the process according to the present invention to prepare the foams having good sound absorption and/or sound insulating properties should be conducted at a relatively low index while using a relatively high amount of water and a relatively high amount of isocyanate-reactive ingredients having a relatively high molecular weight.

In EP 353785 polyurethane foams are produced at a low index and using a relatively high amount of water. The polyisocyanates used do not have the required functionality and/or 2,4'-MDI content. Sound absorption and/or sound insulation properties have not been touched upon.

EP 566248 and EP 566251 show a process for making flexible foams which are useful in automotive seating, amongst others. The processes disclosed are prepolymer processes. No indication has been made that the foams made are suitable for sound absorption and/or sound insulation purposes.

The present invention relates to a fee rise polyurethane foam having a free rise density of 5-40 kg/m³ and preferably of 8-30 kg/m³ (ISO 845) and having a maximal sound absorption of >0.8 (measured according to ASTM E1050-98 in a Kundt tube and at a foam thickness of 20 mm), this maximal absorption being reached at a frequency between 1000 and 2000 Hz.

The present invention is further concerned with a process for preparing a polyurethane foam, according to the free rise process, the foam having a free rise density of 5-40 kg/m³, comprising reacting at an index of 40-80 a polyisocyanate composition consisting of diphenylmethane diisocyanate and of homologues of diphenylmethane diisocyanate, said homologues having an isocyanate functionality of 3 or more, and wherein the polyisocyanate composition has an average isocyanate functionality of 2.10-2.40 and preferably of 2.12-2.40 and most preferably of 2.15-2.40 and a 2,4'-diphenylmethane diisocyanate content of 6-45% by weight with the proviso that the relationship between this functionality (F) and content (C) is: $-123F+287 \le C \le -123F+311$, and a polyoxyethylene polyoxypropylene polyol (polyol b1) having an oxyethylene content of 5-30% by weight, a nominal functionality of 2-4 and an average equivalent weight of 1000-3000, and optionally up to 18 parts by weight, per 100 parts by weight of polyol b1), of a polyoxyalkylene polyol (polyol b2) having an oxyethylene content of at least 50% by weight, a nominal functionality of 2-6 and an average equivalent weight of 75-2000 and comprising using 5-20 parts by weight, per 100 parts by weight of polyol b1, of water as blowing agent, an effective amount of a catalyst enhancing urethane formation, and an effective amount of a surfactant, with the proviso that the amount of isocyanate-reactive ingredients having an equivalent weight of more than 374 is at least 36 parts by weight per 100 parts by weight of polyisocyanate composition and isocyanate-reactive ingredients, that the process is a one shot process and that the amount of catalyst is 0.1-2% by weight and the amount of surfactant is 0.1-5% by weight, both calculated on all isocyanate reactive ingredients.

Surprisingly it was found that the foams according to the present invention show a good sound absorption in particular between 1000 and 2000 Hz which means that a big area of the area between 0.7 and 1.0 absorption and between 1000 and 2000 Hz is under the absorption curve (measured as explained before). In quantitative terms, preferably at least 30% of this area and more preferably 40-90% of this area is under the absorption curve (measured as explained before) for the foams of the present invention.

The foams according to the present invention may be made according to the process according to the present invention. Still further the present invention is concerned with foams obtainable according to the above process and with foams obtained according to the above process and with the use of such foams for sound absorption and/or sound insulation.

The foams according to the present invention show a desirable amount of open cells and a desirable level of air flow resistance, which makes them suitable for use in applications where sound absorption and/or sound insulation are important.

In the context of the present application the following terms have the following meaning:

1) isocyanate index or NCO index or index:

the ratio of NCO-groups over isocyanate-reactive hydrogen atoms present in a formulation, given as a percentage:

$$\frac{[NCO] \times 100}{[\text{active hydrogen}]} (\%)$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual foaming process involving the isocyanate ingredient and the isocyanate-reactive ingredients used in that reaction step. Only the free isocyanate groups and the free isocyanate-reactive hydrogens (including those of the water) present at the actual foaming stage are taken into account.

2) The expression "isocyanate-reactive hydrogen atoms" as used herein for the purpose of calculating the isocyanate index refers to the total of hydroxyl and amine hydrogen atoms present in the reactive compositions in the form of polyols, polyamines and/or water; this means that for the purpose of calculating the isocyanate index at the actual foaming process one hydroxyl group is considered to comprise one reactive hydrogen and one water molecule is considered to comprise two active hydrogens.

3) The expression "polyurethane foams" as used herein generally refers to cellular products as obtained by reacting polyisocyanates with isocyanate-reactive hydrogen containing compounds, using foaming agents, and in particular includes cellular products obtained with water as reactive foaming agent (involving a reaction of water with isocyanate groups yielding urea linkages and carbon dioxide and producing polyurea-polyurethane foams).

4) The term "nominal hydroxyl functionality" or "nominal functionality" or "hydroxyl functionality" is used herein to indicate the functionality (number of hydroxyl groups per molecule) of the polyol composition on the assumption that this is the functionality (number of active hydrogen atoms per molecule) of the initiator(s) used in their preparation although in practice it will often be somewhat less because of some terminal unsaturation. The term "equivalent weight" refers to the molecular weight per isocyanate reactive hydrogen atom in the molecule.

5) The word "average" refers to number average.

6) The wording "one shot" refers to a way of reacting the ingredients to prepare the foam wherein all polyols having an equivalent weight of more than 374 are reacted with polyisocyanate in the presence of water.

The polyisocyanate composition used in the present invention can conveniently be made by mixing a diphenylmethane diisocyanate (MDI) comprising a relatively high amount of 2,4'-MDI and a polymeric or crude MDI in appropriate ratios so as to arrive at the indicated amounts of the ingredients of the polyisocyanate composition.

The homologues having an isocyanate functionality of 3 or more are contained in so-called polymeric or crude MDI.

Polymeric or crude MDI comprise MDI and homologues having an isocyanate functionality of 3 or more and are well known in the art. They are made by the phosgenation of a mixture of polyamines obtained by the acid condensation of aniline and formaldehyde.

The manufacture of both the polyamine mixtures and the polyisocyanate mixtures is well known. The condensation of aniline with formaldehyde in the presence of strong acids such as hydrochloric acid gives a reaction product containing diaminodiphenylmethane together with polymethylene polyphenylene polyamines of higher functionality, the precise composition depending in known manner inter alia on the aniline/formaldehyde ratio. The polyisocyanates are made by phosgenation of the polyamine mixtures and the various proportions of diamines, triamines and higher polyamines give rise to related proportions of diisocyanates, triisocyanates and higher polyisocyanates. The relative proportions of diisocyanate, triisocyanate and higher polyisocyanates in such crude or polymeric MDI compositions determine the average functionality of the compositions, that is the average number of isocyanate groups per molecule. By varying the proportions of starting materials, the average functionality of the polyisocyanate compositions can be varied from little more than 2 to 3 or even higher. In practice, however, the average isocyanate functionality preferably ranges from 2.3-2.8. The NCO value of these polymeric or crude MDIs is at least 30% by weight. The polymeric or crude MDI contain diphenylmethane diisocyanate, the remainder being polymethylene polyphenylene polyisocyanates of functionality greater than two.

The polyisocyanate compositions used in the process according to the present invention may be made by mixing an appropriate amount of MDI and polymeric or crude MDI. For example such polyisocyanates may be made by mixing in appropriate relative amounts SUPRASEC™ MI 20 (obtainable ex Huntsman, SUPRASEC™ is a trademark of Huntsman International LLC), containing about 80% by weight of 4,4'-MDI and about 20% w of 2,4'-MDI and less than 2% by weight of 2,2'-MDI and SUPRASEC™ 2185 (ex Huntsman), a polymeric MDI having an NCO value of 30.7% by weight; comprising about 38% by weight of diisocyanate, the remainder being homologues having an isocyanate functionality of 3 or more; about 6% by weight of the diisocyanates being 2,4'-MDI and less than 1% by weight of the diisocyanates being 2,2'-MDI.

As will be clear from the above the foams according to the present invention are based on polyisocyanates of the diphenylmethane diisocyanate type.

Determining the relative amounts of the MDI, like SUPRASEC™ MI 20, and of the polymeric MDI, like SUPRASEC™ 2185, depends on the finally desired composition and will be routine for someone ordinarily skilled in the art, certainly in the light of the examples.

The relationship between the isocyanate functionality and the 2,4'-MDI content preferably is $-123F+293 \leq C \leq -123F+305$.

Polyols b1) which may be used include products obtained by the polymerisation of ethylene oxide and propylene oxide in the presence, where necessary, of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, cyclohexanedimethanol, glycerol, trimethylolpropane, 1,2,6-hexanetriol and pentaerythritol. Mixtures of initiators and/or cyclic oxides may be used. The polyoxyethylene-polyoxypropylene polyols are obtained by the simultaneous or sequential addition of ethylene and propylene oxides to initiators as fully described in the prior art. Random copolymers, block copolymers and combinations thereof may be used having the indicated amount of oxyethylene groups; preferred ones are those having at least part and preferably all of the oxyethylene groups at the end of the polymer chain (capped or tipped). Mixtures of the said polyols may be used as well. Most preferred are polyoxyethylene polyoxypropylene polyols having an average nominal functionality of 2-4 and most preferably of 3 and an oxyethylene content of 10-25% by weight, preferably having the oxyethylene groups at the end of the polymer chains. Such polyols are commercially available. Examples are DALTOCEL™ F428 and F435 ex Huntsman (DALTOCEL™ is a trademark of Huntsman International LLC).

During the last years several methods have been described to prepare polyether polyols having a low level of unsaturation. The developments have made it possible to use polyether polyols at the higher end of the molecular weight range since much polyols can now be prepared with an acceptably low level of unsaturation. According to the present invention polyols having a low level of unsaturation may be used as well.

Polyols b2) which may be used include products obtained by the polymerisation of ethylene oxide and optionally propylene oxide in the presence, where necessary, of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, cyclohexane dimethanol, glycerol, trimethylolpropane, 1,2,6-hexanetriol, pentaerythritol and sorbitol. Mixtures of initiators and/or cyclic oxides may be used. The polyoxyethylene-polyoxypropylene polyols are obtained by the simultaneous or sequential addition of ethylene and propylene oxides to initiators as fully described in the prior art. Random copolymers, block copolymers and combinations thereof may be used having the indicated amount of oxyethylene groups. Mixtures of the said polyols may be used as well.

Preferred polyols b2) are those having a nominal functionality of 2-4 and an average equivalent weight of 100-1000 and especially those having no oxypropylene groups (i.e. polyoxyethylene polyols). Polyols b2) are commercially available, examples are polyoxyethylene diols having an average molecular weight of 200, 600 and 1000, DALTOCEL™ F526, F444, F442 and F555 all ex Huntsman and G2005 ex Uniqema. A preferred amount of polyol b2) is 2-16 and more preferably 4-16 parts by weight per 100 parts by weight of polyol b1).

Water is used in an amount of 5-20 and preferably 7-17 parts by weight per 100 parts by weight of polyol b1). It acts as blowing agent.

Further a catalyst is used which enhances the urethane formation. It is used in an amount of 0.1-2% by weight (on all isocyanate reactive ingredients). Such catalysts are generally known in the art. Examples are amine catalysts, like triethylenediamine, N,N-dimethylethanolamine, bis(N,N-dimethylaminoethyl)ether, 2-(2-dimethylaminoethoxy)-ethanol, N,N'-diethylpiperazine and 1-(bis(3-dimethylaminopropyl) amino-2-propanol and organometallic compounds like stannous octoate and dibutyltin dilaurate. Mixtures of catalysts may be used as well.

Further surfactants are used in an effective amount to stabilise the foam. Examples of surfactants are nonylphenols, fatty acid ethylene oxide condensates, alkylene oxide block co-polymers, silicones like silicone oils, polydimethylsiloxanes and polyoxyalkylene polysiloxane copolymers. The silicones are most preferred and in particular the polyoxyalkylene polysiloxane copolymers. The surfactants are used in an amount of 0.1-5% by weight (on all isocyanate reactive ingredients). Examples of commercially available surfactants, which are suitable, are Tegostab B 8017 ex Goldschmidt and Ortegol 501 ex Degussa.

Optionally the foams may be made using further additives and auxiliaries commonly used in the polyurethanes art, like fire retardants, chain extenders (isocyanate reactive compounds having 2 active hydrogen atoms and preferably an equivalent weight of less than 75), cross-linkers (isocyanate reactive compounds having 3-8 active hydrogen atoms and preferably an equivalent weight of less than 75), smoke-suppressants, colouring agents, carbon black, anti-microbial agents, anti-oxidants, mould release agents and fillers.

The foams are made by combining and mixing all ingredients and allowing them to react under free rise conditions. The present invention relates to a process for preparing a polyurethane foam according to the free rise process, the foam having a free rise density of 5-40 kg/m$^3$. In the context of the present invention this includes preparing a foam according to the restricted free rise process, the foam having a density which is at most 20% and preferably less than 15% and most preferably less than 10% higher than the free rise density of this foam. A "free rise" foam is a foam which has been made by allowing the ingredients for making the foam to react and the reacting foaming material to rise freely in vertical direction. When "restricted free rise" is employed, means are used in order to make foams with a more rectangular shape and in order to avoid the formation of an uneven upper surface. This reduces the amount of foam waste. Several ways exist to achieve this more rectangular shape; examples known in the art are the use of a so-called floating lid, the Draka/Petzetakis process, the Maxfoam process, the Panibloc process and the Vertifoam process. When "restricted free rise" is employed, it is to be understood in the context of the present application that the restriction applied is of such a nature that the density increase is as limited as possible and as indicated above. All densities are measured according to ISO845.

The reaction is conducted at an index of 40-80 and preferably of 40-70.

The ingredients may be fed independently to the mixing head of a foaming machine. Preferably the isocyanate reactive ingredients are premixed, optionally together with the additives and auxiliaries commonly used in the polyurethanes art, before they are mixed with the polyisocyanate.

The foams obtained have a density of 5-40 and preferably of 8-30 kg/m3 and preferably are flexible foams. The foams have a suitable level of air flow and cell openness which makes them suitable for use in applications wherein good sound absorption and/or sound insulation is required.

The foams are thermoformable and they may act as hot melts. Therefore they are suitable to make layered composites. Further they are suitable as carpet-backing; the foams being heat-pressed onto the backside of a carpet.

The invention is illustrated with the following examples.

EXAMPLES 1-5

The following polyisocyanate compositions were made by mixing the indicated ingredients, which are all obtainable from Huntsman; see Table 1. The average isocyanate functionality (F) and the 2,4'-MDI content (C), in % by weight, of the composition have also been indicated together with the values of $-123F+293$ and $-123F+305$. The amounts of the polyisocyanates are in parts by weight. Compositions 1 and 5-7 are comparative ones.

TABLE 1

| | Polyisocyanate Composition | | | | | | |
|---|---|---|---|---|---|---|---|
| | 1 | 2 | 3 | 4 | 5 | 6 | 7 |
| SUPRASEC ™ 3050 | 5.9 | 25.9 | 14.3 | 6.3 | 22.6 | | |
| SUPRASEC ™ 1306 | 22.8 | — | 6.5 | 10.5 | — | | |
| SUPRASEC ™ 2185 | 7 | 7.7 | 13.6 | 25.6 | — | | |
| SUPRASEC ™ 2090 | — | — | — | — | 20 | | |
| SUPRASEC ™ 5025 | — | — | — | — | — | 41.75 | — |
| SUPRASEC ™ 2020 | — | — | — | — | — | — | 43.95 |
| F | 2.15 | 2.12 | 2.22 | 2.36 | 2.33 | 2.70 | 2.12 |
| C | 10.0 | 39.0 | 22.1 | 9.3 | 28.0 | 6.7 | 2.0 |
| $-123F + 293$ | 28.55 | 32.24 | 19.94 | 2.72 | 6.41 | -39.1 | 32.24 |
| $-123F + 305$ | 40.55 | 44.24 | 31.94 | 14.72 | 18.41 | -27.1 | 44.24 |

Polyol compositions were made by mixing the following ingredients (amounts are in parts by weight); see Table 2.

TABLE 2

| | Polyol Composition | | | | | | |
|---|---|---|---|---|---|---|---|
| | 1 | 2 | 3 | 4 | 5 | 6 | 7 |
| DALTOCEL ™ F435, a polyol b1 | 52.85 | 53.95 | 51.15 | 40.15 | 40.95 | 40.8 | 42.6 |
| DALTOCEL ™ F526, a polyol b2 | — | — | 2 | 4 | 4 | 4 | — |
| water | 4 | 4 | 4 | 5 | 5 | 5 | 5 |
| fire retardant | 6 | 6 | 6 | 6 | 6 | 6 | 6 |
| glycerol | 1 | 1 | 1 | 1 | — | 1 | 1 |
| JEFFCAT ™ ZR50, a polyurethane catalyst, ex Huntsman | 0.25 | 0.25 | 0.25 | 0.25 | 0.25 | 0.25 | 0.25 |
| Ortegol 501, a surfactant ex Degussa | — | 1 | 1 | 1 | 1 | 1 | 1 |
| Yoke JSYK 580, a surfactant ex JiangsuYoke Chemical Co. Ltd. | 0.2 | 0.2 | 0.2 | 0.2 | 0.2 | 0.2 | 0.2 |

Foams were made by mixing the polyisocyanate compositions 1-7 and the polyol compositions 1-7 and allowing the mixture so formed to react and to rise freely; see Table 3; the properties of the foams and the index are indicated as well. Foams 1 and 7 collapsed and were useless. Foams 5 and 6 shrank and were useless as well.

TABLE 3

| Foam | 1 | 2 | 3 | 4 | 5 | 6 | 7 |
|---|---|---|---|---|---|---|---|
| Polyisocyanate Composition | 1 | 2 | 3 | 4 | 5 | 6 | 7 |
| Polyol Composition | 1 | 2 | 3 | 4 | 5 | 6 | 7 |
| Index | 52 | 52 | 52 | 52 | 52 | 49 | 50 |
| Density, kg/m³ (Iso 845) | — | 27 | 27 | 17 | — | — | — |
| Hardness, kPa (Iso 3386/1) | — | 2.1 | 2.9 | 3.9 | — | — | — |
| Tear Strength, N/m (Iso 8067) | — | 185 | 115 | 86 | — | — | — |
| Tensile Strength, kPa (Iso 1798) | — | 45 | 50 | 47 | — | — | — |
| Elongation, % (Iso 1798) | — | 132 | 112 | 62 | — | — | — |
| $\alpha_{max}$ (ASTM E1050-98, Kundt, 20 mm) | — | 0.92 | 0.95 | 1.00 | — | — | — |
| frequency of $\alpha_{max}$, Hz (ASTM E1050-98, Kundt, 20 mm) | — | 1400 | 1500 | 1500 | — | — | — |

EXAMPLE 6

Comparative

Example 4 was repeated in a mould. The chemicals were mixed and poured in a square block mould (30×30×10 cm; mould temperature was 45° C.). The mould was closed and the reaction was allowed to take place.

An overpack of 50% was needed to just fill the mould. The demould time was about 15 minutes. The material obtained had an overall density of 24 kg/m³; showed deep surface defects and severe shrinkage. In fact it was useless. The $\alpha_{max}$ and the frequency of $\alpha_{max}$, measured as above, were 0.90 and 1500 Hz, respectively, before crushing and 0.87 and 1800 Hz, respectively, after crushing.

The area under the absorption curve between 1000 and 2000 Hz and between 0.7 and 1.0 absorption was 63% for example 4, 17% for the moulded foam of this example before crushing and 10% after crushing.

SUPRASEC™ 3050, 1306, 2185, 2090, 5025 and 2020 are polyisocyanates ex Huntsman. JEFFCAT™ is a trademark of Huntsman.

The invention claimed is:

1. Process for preparing a polyurethane foam, according to the free rise process, the foam having a free rise density of 5-40 kg/m³, comprising reacting at an index of 40-65 a polyisocyanate composition consisting of diphenylmethane diisocyanate and of homologues of diphenylmethane diisocyanate, said homologues having an isocyanate functionality of 3 or more, and wherein the polyisocyanate composition has an average isocyanate functionality of 2.10-2.40 and a 2,4'-diphenylmethane diisocyanate content of 6-45% by weight with the proviso that the relationship between this functionality (F) and content (C) is: $-123F+287 \leq C \leq -123F+311$, and a polyoxyethylene polyoxypropylene polyol (polyol b1) having an oxyethylene content of 5-30% by weight, a nominal functionality of 2-4 and an average equivalent weight of 1000-3000, and optionally up to 18 parts by weight, per 100 parts by weight of polyol b1), of a polyoxyalkylene polyol (polyol b2) having an oxyethylene content of at least 50% by weight, a nominal functionality of 2-6 and an average equivalent weight of 75-2000 and comprising using 5-20 parts by weight, per 100 parts by weight of polyol b1, of water as blowing agent, an effective amount of a catalyst enhancing urethane formation, and an effective amount of a surfactant, with the proviso that the amount of isocyanate-reactive ingredients having an equivalent weight of more than 374 is at least 36 parts by weight per 100 parts by weight of polyisocyanate composition and isocyanate-reactive ingredients, that the process is a one shot process and that the amount of catalyst is 0.1-2% by weight and the amount of surfactant is 0.1-5% by weight, both calculated on all isocyanate reactive ingredients.

2. Process according to claim 1 wherein preparing the polyurethane foam includes preparing a polyurethane foam having a free rise density of 8-30 kg/m³.

3. Process according to claim 1 wherein polyol b2 is present in an amount of 2-16 parts by weight per 100 parts by weight of polyol b1.

4. Process according to claim 1 wherein polyol b2 is present in an amount of 4-16 parts by weight per 100 parts by weight of polyol b1 and the functionality of polyol b2 is 2-4.

5. Process according to claim 1 wherein reacting a polyisocyanate composition includes reacting the polyisocyanate composition having an average isocyanate functionality of 2.15-2.40.

6. Process according to claim 1 wherein polyol b2 is present and is polyoxyethylene polyol having no oxypropylene groups.

7. Process according to claim 1 wherein using water as a blowing agent includes using water in the amount of 7-17 parts by weight per 100 parts by weight of polyol b1.

8. Process according to claim 1 wherein reacting a polyisocyanate composition includes reacting a polyisocyanate composition having the relationship between the functionality (F) and the content (C) which is $-123F+293 \leq C \leq -123F+305$.

9. Polyurethane foam obtained according to the process of claim 1.

10. A method of making a polyurethane foam comprising reacting, via a one shot process:
- a polyisocyanate composition, at an index of 40-65, consisting of diphenylmethane diisocyanate and homologues of diphenylmethane diisocyanate, said homologues having an isocyanate functionality of 3 or more, and wherein the polyisocyanate composition has an average isocyanate functionality of 2.10-2.40 and a 2,4'-diphenylmethane diisocyanate content of 6-45% by weight, the relationship between the functionality (F) and content (C) is: $-123F+287 \leq C \leq -123F+311$; and
- a polyoxyethylene polyoxypropylene polyol (polyol b1) having an oxyethylene content of 5-30% by weight, a nominal functionality of 2-4 and an average equivalent weight of 1000-3000; and
- using, in said one shot process, water as a blowing agent in an amount of 5-20 parts by weight per 100 parts by weight of polyol b1, a urethane-forming catalyst in an amount of 0.1-2% by weight calculated on all isocyanate reactive ingredients, and a surfactant in an amount of 0.1-5% by weight calculated on all isocyanate reactive ingredients; and
- wherein the amount of isocyanate-reactive ingredients have an equivalent weight of more than 374 and are at least 36 parts by weight per 100 parts by weight of polyisocyanate composition and isocyanate-reactive ingredients.

11. The method of claim 10 wherein making the polyurethane foam includes reacting, via said one-shot process, the polyisocyanate composition, the polyol b1, and a polyol b2, said polyol b2 having up to 18 parts by weight, per 100 parts by weight of polyol b1, of a polyoxyalkylene polyol that has an oxyethylene content of at least 50% by weight, a nominal functionality of 2-6, and an average equivalent weight of 75-2000.

* * * * *